(12) United States Patent
Hellsten

(10) Patent No.: US 9,618,606 B2
(45) Date of Patent: Apr. 11, 2017

(54) ANTENNA SYSTEM FOR POLARIZATION DIVERSITY

(71) Applicant: SAAB AB, Linkoeping (SE)

(72) Inventor: Hans Hellsten, Linkoeping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 15/124,885

(22) PCT Filed: Mar. 12, 2014

(86) PCT No.: PCT/SE2014/050304
§ 371 (c)(1),
(2) Date: Sep. 9, 2016

(87) PCT Pub. No.: WO2015/137853
PCT Pub. Date: Sep. 17, 2015

(65) Prior Publication Data
US 2017/0016978 A1    Jan. 19, 2017

(51) Int. Cl.
*G01S 7/02* (2006.01)
*H01Q 1/28* (2006.01)
(Continued)

(52) U.S. Cl.
CPC .............. *G01S 7/024* (2013.01); *G01S 7/025* (2013.01); *G01S 7/026* (2013.01); *H01Q 1/28* (2013.01);
(Continued)

(58) Field of Classification Search
CPC ........ G01S 7/024–7/026; G01S 13/885; G01S 13/887; G01S 13/888; H01Q 1/28; H01Q 25/00; H01Q 25/001
(Continued)

(56) References Cited

U.S. PATENT DOCUMENTS 4,006,481 A * 2/1977 Young ..................... E02F 9/245
324/329
4,728,897 A * 3/1988 Gunton ................... G01S 7/026
324/329
(Continued)

FOREIGN PATENT DOCUMENTS

WO    WO 2004/042427 A1    5/2004
WO    WO 2014/098660 A1    6/2014

OTHER PUBLICATIONS

International Searching Authority, International Search Report and Written Opinion for International Application No. PCT/SE2014/050304, Nov. 25, 2014, 8 pages, Swedish Patent and Registration Office, Sweden.

*Primary Examiner* — Peter Bythrow
(74) *Attorney, Agent, or Firm* — Alston & Bird LLP

(57) ABSTRACT

An antenna system (100) comprising a single antenna element having first (111) and second (112) antenna ports arranged to pass a respective first and second antenna signal. The first and second antenna signals being derived from a first common antenna signal ($J_1$) and arranged to be essentially equal in envelope. An antenna pattern of the system being arranged to be selectable between a first antenna pattern having a first polarization and a second antenna pattern having a second polarization substantially orthogonal to the first polarization. The first antenna pattern being selected by setting the first and second antenna signal to have the same polarity on first (111) and second (112) antenna ports, the second antenna pattern being selected by setting the first and second antenna signal to have substantially opposite polarities on first (111) and second (112) antenna ports.

19 Claims, 10 Drawing Sheets

(51) Int. Cl.
  *H01Q 7/00* (2006.01)
  *H01Q 11/14* (2006.01)
  *H04B 7/10* (2017.01)
  *H01Q 1/48* (2006.01)
  *H01Q 25/00* (2006.01)
  *G01S 13/88* (2006.01)

(52) U.S. Cl.
  CPC ............... *H01Q 1/48* (2013.01); *H01Q 7/00* (2013.01); *H01Q 11/14* (2013.01); *H04B 7/10* (2013.01); *G01S 13/885* (2013.01); *H01Q 25/00* (2013.01)

(58) Field of Classification Search
  USPC ......................................................... 342/22
  See application file for complete search history.

(56) References Cited

U.S. PATENT DOCUMENTS

| | | | | |
|---|---|---|---|---|
| 4,733,245 A * | 3/1988 | Mussler | ................ | H01Q 19/09 343/769 |
| 4,812,850 A * | 3/1989 | Gunton | ................... | G01S 7/026 324/329 |
| 5,568,159 A * | 10/1996 | Pelton | .................. | H01Q 13/085 343/767 |
| 6,429,802 B1 * | 8/2002 | Roberts | .................... | G01V 3/12 342/175 |
| 7,170,449 B2 * | 1/2007 | Eide | ......................... | G01V 3/12 343/700 MS |
| 7,994,999 B2 * | 8/2011 | Maeda | ................. | H01Q 9/0407 343/700 MS |
| 2004/0118313 A1 * | 6/2004 | Temes | ..................... | F41H 11/12 102/498 |
| 2006/0049980 A1 * | 3/2006 | Archer | .................. | G01S 13/887 342/179 |
| 2007/0013582 A1 * | 1/2007 | Kwon | ..................... | G01S 7/026 342/188 |
| 2007/0024489 A1 * | 2/2007 | Cerwin | .................... | G01V 3/17 342/22 |
| 2007/0052576 A1 * | 3/2007 | Hausner | .................. | G01S 7/024 342/22 |
| 2009/0195435 A1 * | 8/2009 | Kapilevich | ............. | G01S 7/032 342/22 |
| 2010/0328137 A1 * | 12/2010 | Krapf | ..................... | G01S 7/024 342/27 |
| 2015/0042532 A1 * | 2/2015 | Parsche | .................... | H01Q 9/28 343/807 |
| 2015/0123838 A1 * | 5/2015 | Shi | ......................... | G01S 7/025 342/70 |
| 2015/0276928 A1 * | 10/2015 | Bowers | .................... | H01Q 3/24 342/368 |
| 2015/0331097 A1 * | 11/2015 | Hellsten | .................. | G01S 7/292 342/25 F |

* cited by examiner

ANTENNA SYSTEM FOR POLARIZATION DIVERSITY

CROSS REFERENCE TO RELATED APPLICATIONS

This application is a National Stage Application, filed under 35 U.S.C. 371, of International Application No. PCT/SE2014/050304, filed Mar. 12, 2014; the contents of which are hereby incorporated by reference in their entirety.

BACKGROUND

Related Field

The present disclosure relates to an antenna system for transmission and reception of polarized signals, and in particular to transmission and reception of polarized radar signals.

Description of Related Art

Low frequency radar systems, i.e., involving wavelengths on the order of meters, and airborne low frequency radar systems in particular, can be used for finding targets buried under ground or hidden below camouflage or trees. Low frequency radar systems can also be applied in establishing environmental parameters such as biomass.

The physics governing how low frequency radar signals interact with the ground depend to a high degree on the polarization state of the signal. Therefore, collecting data for both vertical and horizontal polarization is often valuable and sometimes even necessary.

Due to the comparably low frequencies involved, and the dependency on polarization state of the radar signal, the design of radar antennas in the area of airborne meter wavelength radar contains several significant challenges.

For instance, antennas must be physically quite large—the smallest high efficiency antenna is half a wavelength dipole, meaning that such dipoles will be of meter size. A dipole is not directive in contrast to conventional radar antennas, which extends for many wavelengths not only in one dimension, as a dipole, but in two dimensions. Just scaling such antennas is clearly not feasible for low frequency radar. Also, dipoles are often required to be wideband in the sense that the radar often needs to function and keep a reasonably constant antenna diagram or antenna pattern across a bandwidth of at least octave order.

Also, the polarization state of transmitted and received radar signals must often be controllable or selectable. In some applications, the polarization state also needs to be alternated with kHz order switching frequency, or used in parallel for horizontal and vertical polarization, so that radar response for both polarizations can be collected.

Hence, there is a need for an antenna system for use with low frequency radar systems which is comparably compact in terms of size, and where the polarization state of the transmitted and received radar signals can be controlled.

BRIEF SUMMARY

An object of the present disclosure is to provide antenna systems, vehicles, and methods, which seek to mitigate, alleviate, or eliminate one or more of the above-identified deficiencies in the art and disadvantages singly or in any combination.

This object is obtained by an antenna system comprising an antenna structure consisting of a single antenna element having first and second antenna ports arranged to pass a respective first and second antenna signal. The first and second antenna signals arranged to be derived from a first common antenna signal and also arranged to be essentially equal in envelope. The antenna structure is arranged to have an antenna pattern which is selectable between a first antenna pattern having a first polarization and a second antenna pattern having a second polarization substantially orthogonal to the first polarization. The first antenna pattern is selected by setting the first and second antenna signal to have the same polarity on first and second antenna ports. The second antenna pattern is selected by setting the first and second antenna signal to have substantially opposite polarities on first and second antenna ports.

Thus, there is provided an antenna system particularly suitable for use with low frequency radar systems in that the antenna system is compact in terms of size due to the single antenna element, which is an advantage.

The provided antenna system brings an additional advantage in that the polarization state of transmitted and received signals can be controlled or selected in a straightforward way by setting the polarities of the first and second antenna signal.

According to one aspect, the antenna system further comprises a first antenna interface unit comprising a 180 degree hybrid coupler, a switching unit, and a first common port for passing the first common antenna signal. The 180 degree hybrid coupler has first and second coupler ports connected to the first and to the second antenna port, respectively, as well as a summation and a difference port connected to the switching unit. The switching unit is arranged to connect the first common port of the antenna interface unit to either of the summation port or the difference port of the 180 degree hybrid coupler, thus selecting between the first and the second antenna pattern of the antenna system.

Thus, by the feature of the antenna interface unit, connecting a radar transceiver to the antenna system is facilitated, which is an advantage. Further, switching between polarization states, i.e., selecting the polarization of transmitted and received signals, is simplified due to the feature of the switching unit, which is also an advantage.

According to another aspect, the first and second antenna ports are also arranged to pass a third and a fourth antenna signal, respectively. The third and fourth antenna signals have substantially identical envelopes and are derived from a second common antenna signal which is substantially orthogonal to the first common antenna signal. The antenna system, according to said aspect, comprises a second antenna interface unit. The second antenna interface unit comprises a second and a third common port for passing the first and the second common antenna signal, respectively, as well as a 180 degree hybrid coupler. The 180 degree hybrid coupler has first and second coupler ports connected to the first and to the second antenna port, respectively, as well as a summation and a difference port connected to the second and third common ports, respectively, thus selecting the first polarization for one of the first and the second common signal, and selecting the second polarization for the other of the first and second common signal.

Thus, advantageously, the antenna system can be used simultaneously in both polarization states. The first common antenna signal mainly resides in one polarization, the second common antenna signal mainly resides in the other polarization.

According to a further aspect, the antenna structure comprises an elongated conductive bridge having a length between first and second ends smaller than half of the wavelength corresponding to the highest frequency of the first common antenna signal. The antenna structure further comprises two elongated conductive legs arranged in parallel and having respective lengths between first and second ends smaller than half of the wavelength corresponding to the highest frequency of the first common antenna signal. Said legs are attached at first leg ends to either end of the elongated conductive bridge in right angles with respect to the conductive bridge, thus substantially forming a U-shape. The sum of lengths of the elongated conductive bridge and the two elongated conductive legs is substantially equal to half of the wavelength corresponding to the center frequency of the first common antenna signal. The first antenna port is connected to the second end of one leg, the second antenna port is connected to the second end of the other leg. The antenna structure is arranged to have a ground plane orthogonal to both legs and located approximately at the second ends of the legs. The antenna structure has a total length, including elongated conductive bridge and both legs, less than the wavelength corresponding to the highest frequency of the first common antenna signal.

According to an aspect, the elongated conductive bridge is extended by first and second conductive extension units connected at either end of the elongated conductive bridge, thus substantially forming a Π-shape, the total length of the elongated conductive bridge with extension units being smaller than the wavelength corresponding to the highest frequency of the common antenna signal.

Thus, advantageously, by any of the U-shape or Π-shaped antenna structures disclosed herein, there is provided a wideband antenna of comparably small size which facilitates attaining compliancy with, e.g., aeromechanical requirements and where the polarization state of the transmitted and received signals can be controlled and also alternated or even used in parallel for horizontal and vertical polarization so that, e.g., radar response for both polarizations can be collected. This will be further discussed in the detailed description below.

The feature of the extension units being smaller than the wavelength corresponding to the highest frequency of the common antenna signal advantageously contributes to preventing excitation of the bridge due to the length of the bridge being on the order of a wavelength of the first common signal in size.

According to one aspect, the antenna system is adapted to be mounted on an airborne vehicle.

According to another aspect, the antenna system is adapted to be mounted on a surface based vehicle.

The object is also obtained by an airborne vehicle arranged to carry the antenna system of the present disclosure.

The object is further obtained by a method for selecting an antenna pattern of an antenna system. The antenna system comprising an antenna structure consisting of a single antenna element having first and second antenna ports arranged to pass a respective first and second antenna signal. The antenna pattern of the antenna structure is arranged to be selectable between a first antenna pattern having a first polarization and a second antenna pattern having a second polarization substantially orthogonal to the first polarization. The method comprising the steps of receiving a first common signal, and deriving the first and second antenna signals from the first common signal, as well as setting the first and second antenna signal to have the same polarity on first and second antenna ports in case the first antenna pattern is selected or setting the first and second antenna signal to have substantially opposite polarities on first and second antenna ports in case the second antenna pattern is selected.

The vehicles and the method all display advantages corresponding to the advantages already described in relation to the disclosed antenna system.

BRIEF DESCRIPTION OF THE FIGURES

Further objects, features, and advantages of the present disclosure will appear from the following detailed description, wherein some aspects of the disclosure will be described in more detail with reference to the accompanying drawings, in which.

DETAILED DESCRIPTION OF VARIOUS EMBODIMENTS

Figure 1:
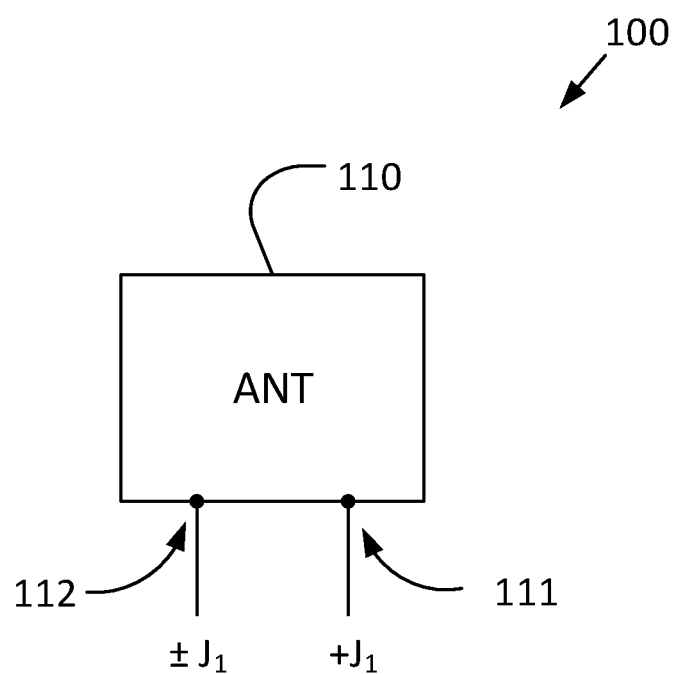
FIGS. 1-4 show block diagrams of antenna systems of the disclosure.

Aspects of the present disclosure will be described more fully hereinafter with reference to the accompanying drawings. The apparatus, vehicles, and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

In the following, we will mainly discuss antenna behavior during transmission—reception behavior is assumed substantially the same by reciprocity.

FIG. 1 shows an antenna system 100 comprising an antenna structure 110 consisting of a single antenna element. The single antenna element has first 111 and second 112 antenna ports arranged to pass a respective first and second antenna signal, which are derived from a first common antenna signal $J_1$ and arranged to be essentially equal in envelope. The antenna pattern of the antenna structure 110 is arranged to be selectable between a first antenna pattern having a first polarization and a second antenna pattern having a second polarization substantially orthogonal to the first polarization. The first antenna pattern is arranged to be selected by setting the first and second antenna signal to have the same polarity on first 111 and second 112 antenna ports, while the second antenna pattern is selected by setting the first and second antenna signal to have substantially opposite polarities on first 111 and second 112 antenna ports.

Herein, 'essentially equal in envelope' means that the first antenna signal is essentially equal to the second antenna signal except for a possible difference in phase between the two signals. In other words, assuming that the first antenna signal is given by $s_1(t)$ and the second antenna signal is given by $s_2(t)$, then $|s_1(t)| \cong |s_2(t)|$. If the first and second antenna signals have the same polarity on first 111 and second 112 antenna ports, then $s_1(t) \cong s_2(t)$, while if the first and second antenna signal have opposite polarities on first 111 and second 112 antenna ports, then $s_1(t) \cong -s_2(t)$.

As will be further exemplified below in connection with FIGS. 5a, 5b, 6a, and 6b, the antenna structure 110 is arranged according to a geometry such that the polarity of antenna signals determines the polarization state of signals transmitted or received by the antenna system 100. The antenna signals are taken from the same common signal, and simply altered in polarity. Herein, opposite polarity is to be construed as two signals having substantially opposite phases, i.e., are out-of-phase, while same polarity is to be construed as signals having the same phase, i.e., are in-phase.

The antenna system shown in FIG. 1 is arranged in either of a receiver mode, a transmitter mode, or a transceiver mode. The antenna structure 110, when in receiver mode, is arranged to output antenna signals on first 111 and second 112 antenna ports received via the antenna structure 110. The antenna structure 110, when in transmitter mode, is arranged to receive antenna signals on first 111 and second 112 antenna ports to be emitted via the antenna structure 120. The antenna structure 110, when in transceiver mode, is arranged to simultaneously output and receive antenna signals on first 111 and second 112 antenna ports.

Figure 2A:
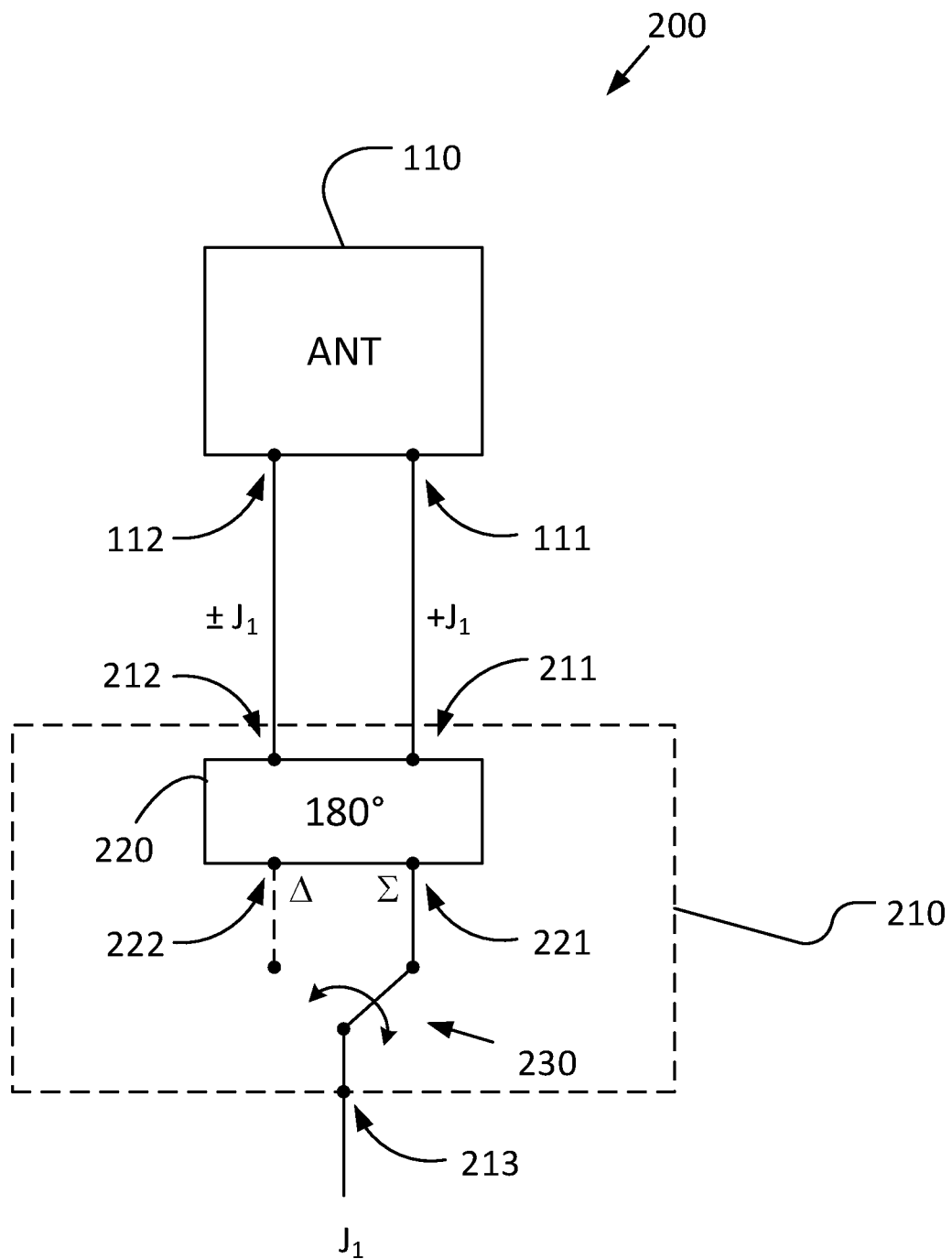

FIG. 2a shows an antenna system 200 which further comprises a first antenna interface unit 210. The first antenna interface unit comprises a 180 degree hybrid coupler 220, a switching unit 230, and a first common port 213 for passing the first common antenna signal $J_1$. The 180 degree hybrid coupler 220 has first 211 and second 212 coupler ports connected to the first 111 and to the second 112 antenna port, respectively, as well as a summation 221 and a difference 222 port connected to the switching unit 230. The switching unit 230 is arranged to connect the first common port 213 of the antenna interface unit 210 to either of the summation port 221 or the difference port 222 of the 180 degree hybrid coupler 220. Thus selecting between the first and the second antenna pattern of the antenna system 200 is facilitated by means of the switching unit 230.

The switching unit 230 can be configured to alternate between states in a pre-determined schedule, or be configured to be manually controlled by an external control signal which determines the state of the switch. As a general rule of thumb, the switching of the switching unit 230 should be done as seldom as possible, e.g., with switching frequency kHz range, in order to obtain best performance of an attached low frequency radar system used in a synthetic aperture radar, SAR, application.

Figure 2B:
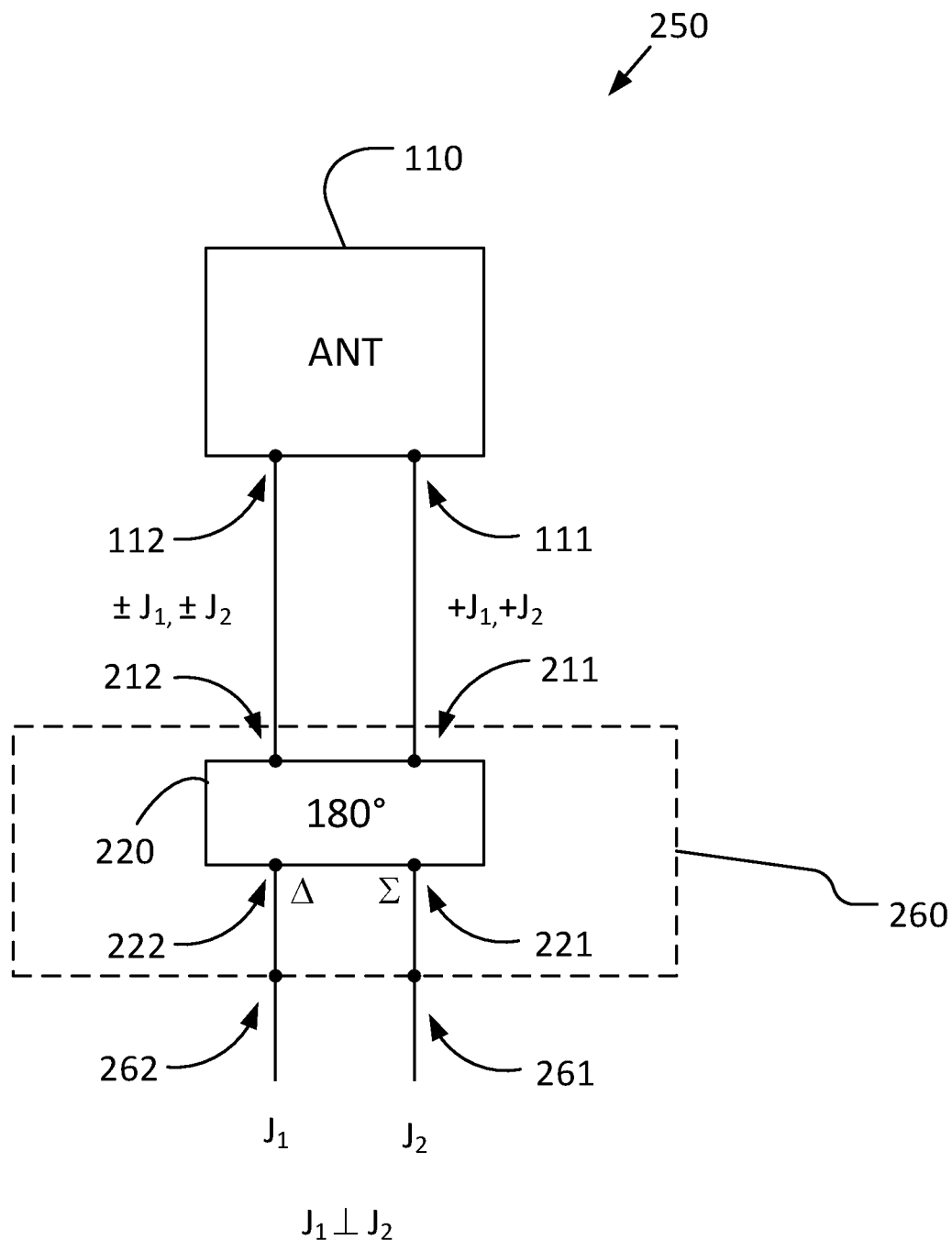

FIG. 2b shows an antenna system 250 where the first 111 and second 112 antenna ports further are arranged to pass a third and a fourth antenna signal, respectively, in addition to the first and the second antenna signal. The third and fourth antenna signals have substantially identical envelopes and are derived from a second common antenna signal $J_2$ which is configured to be substantially orthogonal to the first common antenna signal $J_1$. The antenna system 250 also comprises a second antenna interface unit 260. The second antenna interface unit 260 comprises second 261 and third 262 common ports for passing the first $J_1$ and also the second $J_2$ common antenna signal. There is also comprised a 180 degree hybrid coupler 220. The 180 degree hybrid coupler 220, as in FIG. 2a above, has first 211 and second 212 coupler ports connected to the first 111 and to the second 112 antenna port, respectively, as well as a summation 221 and a difference 222 port connected to the second 261 and third 262 common ports, respectively, thus selecting the first polarization for one of the first $J_1$ and the second $J_2$ common signal, and selecting the second polarization for the other of the first $J_1$ and second $J_2$ common signal.

According to different aspects, the first and second common antenna signals are configured to be orthogonal in different ways. Here, orthogonal means that the first and second common antenna signals are separable and do not interfere significantly with each other during operation.

According to one such aspect, the first $J_1$ and the second $J_2$ common signal are orthogonal by separation in frequency, e.g., by means of frequency division duplex, FDD.

According to one such aspect, the first $J_1$ and the second $J_2$ common signal are orthogonal by separation in time, e.g., by means of time division duplex, TDD.

According to one such aspect, the first $J_1$ and the second $J_2$ common signal are orthogonal by separation in code, e.g., by means of band spreading by orthogonal codes.

Figure 3:
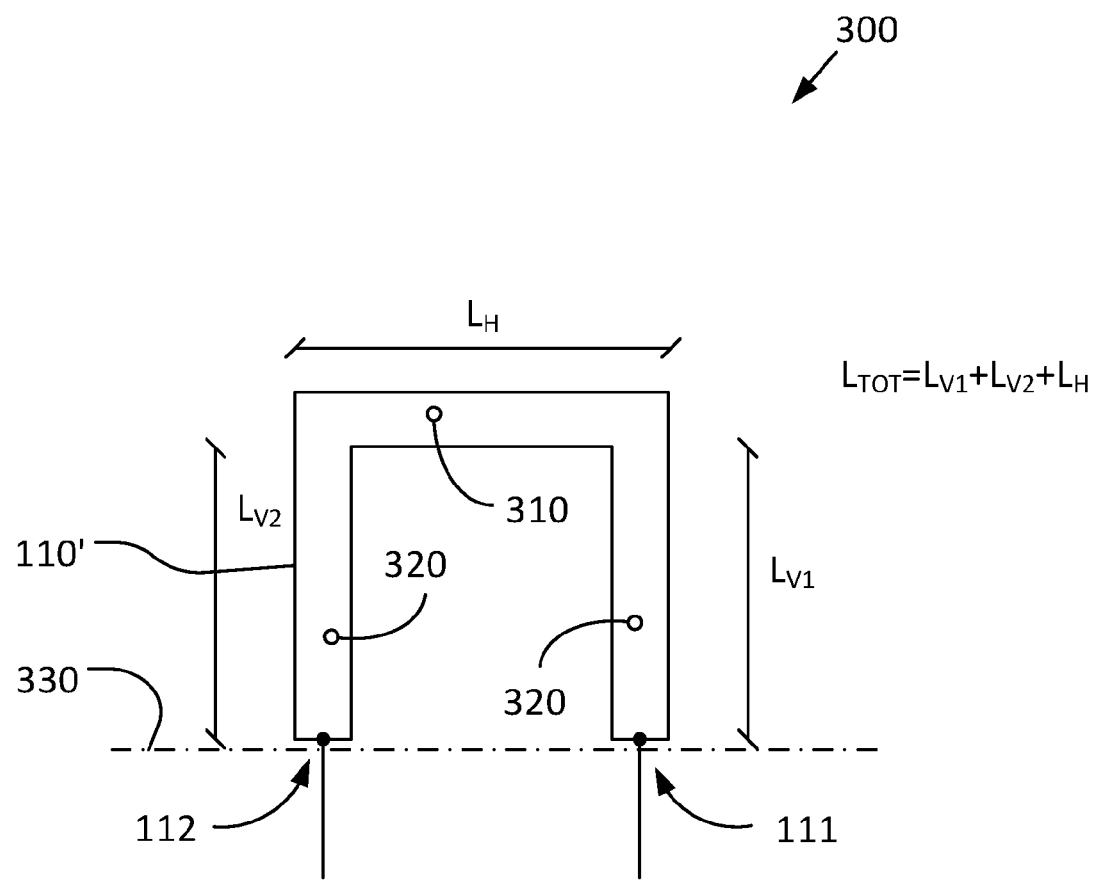

FIG. 3 shows an antenna structure 110' comprising an elongated conductive bridge 310 having a length $L_H$ between first and second ends smaller than half of the wavelength corresponding to the highest frequency of the first common antenna signal $J_1$. The antenna structure 110' further comprises two elongated conductive legs arranged in parallel and having respective lengths $L_{V1}$ and $L_{V2}$ between first and second ends smaller than half of the wavelength corresponding to the highest frequency of the first common antenna signal $J_1$. The legs 320 are attached at first ends to either end of the elongated conductive bridge 310 in right angles with respect to the conductive bridge 310. Thus the legs and the bridge together substantially form a conductive U-shape. The sum of lengths of the elongated conductive bridge 310 and the two elongated conductive legs 320 is substantially equal to half of the wavelength corresponding to the center frequency of the first common antenna signal $J_1$. The first 111 antenna port is connected to the second end of one leg, the second 112 antenna port is connected to the second end of the other leg.

The antenna structure 110' is further arranged to have a ground plane 330 orthogonal to both legs and located approximately at the second end of the legs. Preferably, there is arranged a small separation between the legs 320 and said ground plane 300, as shown in FIG. 3.

The antenna structure 110' has a total length $L_{TOT}=L_{V1}+L_{V2}+L_H$, including elongated conductive bridge 310 and both legs 320 less than the wavelength corresponding to the highest frequency of the first common antenna signal $J_1$.

It should be noted that any references to sizes, frequencies, and wavelengths are to be construed as approximate. Thus, at least partial functionality of the antenna system is obtained even if dimensioned slightly outside of given lengths.

References will be made herein to a U-shape or U antenna, and to a Pi-shape or Pi antenna. The U-shape antenna corresponds to the antenna system 300 shown, e.g., in FIG. 3, while the Pi-shape antenna corresponds to the antenna system 400 shown, e.g., in FIG. 4. However, it is also noted that, according to aspects, the two legs of the antenna structure need not necessarily have the same lengths. In fact, according to some aspects, one leg in the U-shape can have zero length.

Also, the lengths of the two parallel legs will at times herein be referred to by the common reference symbol $L_V$, instead of $L_{V1}$ and $L_{V2}$. In such cases when the common reference symbol $L_V$ is used, the two legs are assumed to be of equal length, i.e., $L_{V1}=L_{V2}=L_V$.

Basic to the present technique is an antenna element in the form of a conducting material bent in U shape. This U-shape, as shown in FIG. 3, consists of two vertical legs each with one open end and the opposite ends interconnected by a horizontal bridge. The antenna element will have the open ends meeting ground plane at right angles without actually being in electrical contact with this plane, and the ends are connected to the radar transceiver and fed from this transceiver with the same or with opposite polarity.

When excited by, e.g., a radar transceiver, the U element will interact with its mirror image in the ground plane. If the length $L_V$ is chosen as a quarter of the free space wavelength of the antenna feeding signal, i.e., the common signal, and feeding the two legs of the U with the same polarity, each leg will behave as a monopole. This means that each leg constructively interacts with the ground plane mirror image to form a half wavelength dipole. Keeping the bridge length $L_H$ shorter than half a wavelength means that the bridge will not provide any significant radiation contribution. Thus the radiation produced will be that of the monopole pair and will provide maximum radiation in the direction broadside to the U-shape 110'. There will be no significant radiation in the vertical direction. The electric field will always be substantially parallel to the legs of the U-shape 110'.

If on the other hand the two legs are fed with opposite polarity and $2L_V+L_H$ is half a wavelength of the U-shape 110', the U-shape 110' constructively interacts with its mirror image to form a magnetic dipole. For impedance matching reasons $L_H$ should not be too small but say that both $L_H$ and $L_V$ are on the order of a little less than quarter of a wavelength, then both the $L_V$ are close to quarter of a wavelength and $2L_V+L_H$ are close to half a wavelength meaning that the antenna has two efficient modes of excitation. A magnetic excitation will produce a radiation pattern where radiation is zero on the broadside of the U-shape 110' and is maximum in the pane of the U. The magnetic field will always be parallel to the broadside direction.

The U-shape antenna shown in FIG. 3 is broad-band in the sense that radiation efficiency diminishes when the antenna feed wavelength becomes larger than the resonant condition so far discussed. However, the radiation pattern will not change. When frequencies increase from the resonance condition described the radiation diagram will remain the same until $L_V$ approaches half a wavelength of the feed signal or $2L_V+L_H$ approaches a full wavelength. It follows that the acceptable limit of top frequency is when $L_V$ and $L_H$ are both smaller than half of the smallest wavelength of the common antenna signal.

A typical selection of frequency and bandwidth center frequency $f_C$ is chosen equal to bandwidth B and depending on application $f_C$=55 MHz or $f_C$=240 MHz. For these two choices one gets half of the smallest wavelength of the common antenna signal equal to approximately 1.8 meters and 0.4 meters, respectively. Typical choices of $L_V$ and $L_H$ can be 1 m and 0.25 m respectively.

Figure 4:
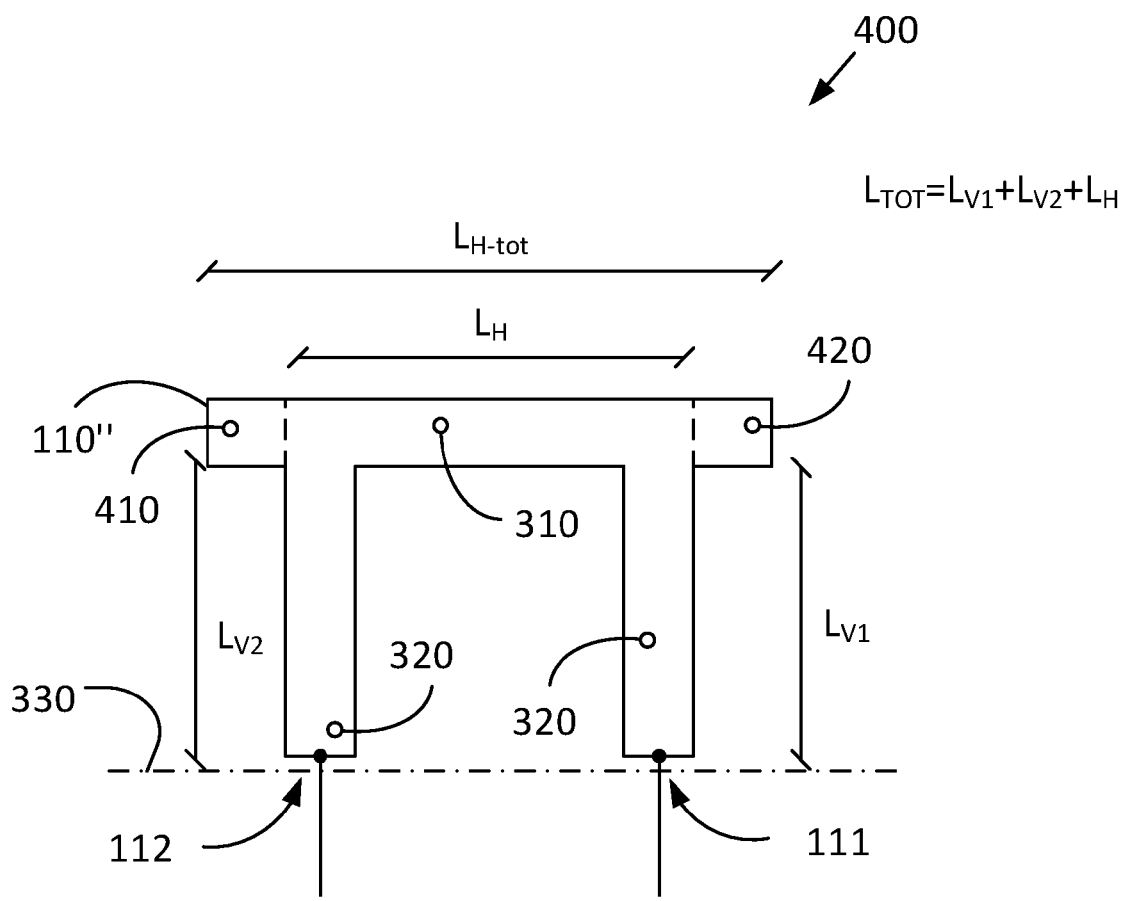

FIG. 4 shows an antenna system 400 where the elongated conductive bridge 310 has been extended by first 410 and second 420 conductive extension units connected at either end of the elongated conductive bridge 310, thus substantially forming a Π-shape. The total length of the elongated conductive bridge 310 including extension units 410, 420 is configured to be smaller than the wavelength corresponding to the highest frequency of the common antenna signal J.

The feature of the elongated conductive bridge 310 including extension units 410, 420 being smaller than the wavelength corresponding to the highest frequency of the common antenna signal advantageously prevents excitation of the bridge due to the bridge being on the order of a wavelength in size.

Note also the ground plane 330 of the antenna structure 110", which ground plane 330 is shown in FIG. 4 as a dash-dotted line.

Figure 5A:
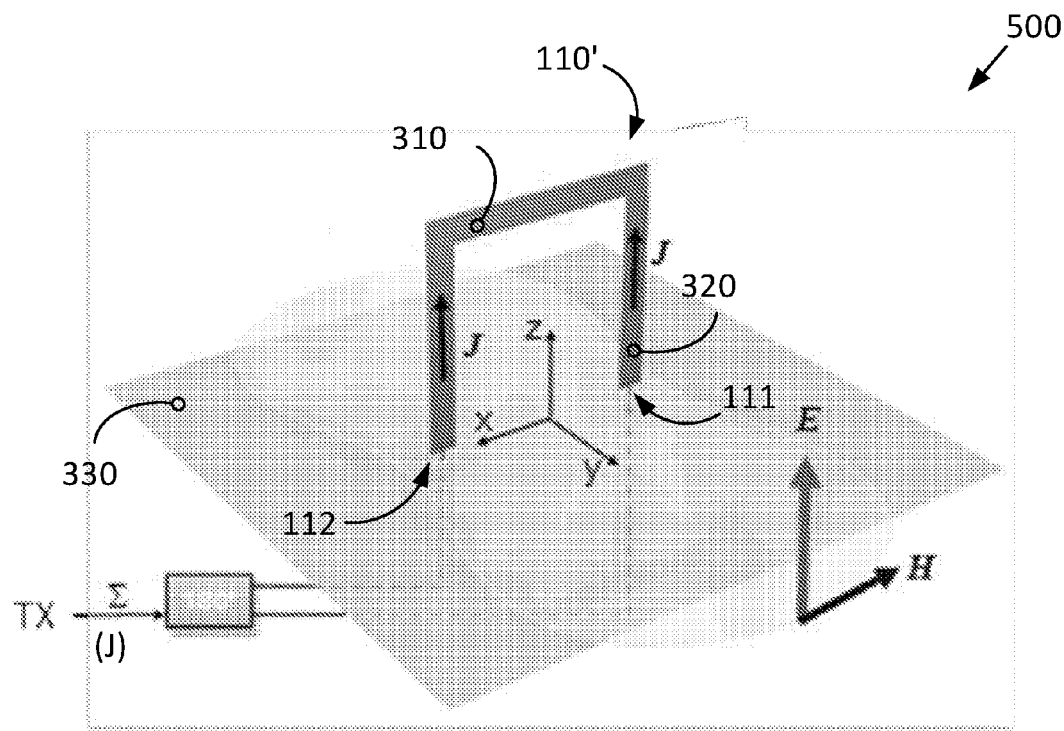
FIGS. 5-6 schematically show radiation patterns of disclosed antenna structures, and FIGS. 7-8 schematically show airborne vehicles comprising an antenna system of the disclosure.

FIG. 5a shows a "U-shape" antenna of the disclosure with electric excitation, i.e., where the first and second antenna signal are set to have the same polarity on first 111 and second 112 antenna ports.

Figure 5B:
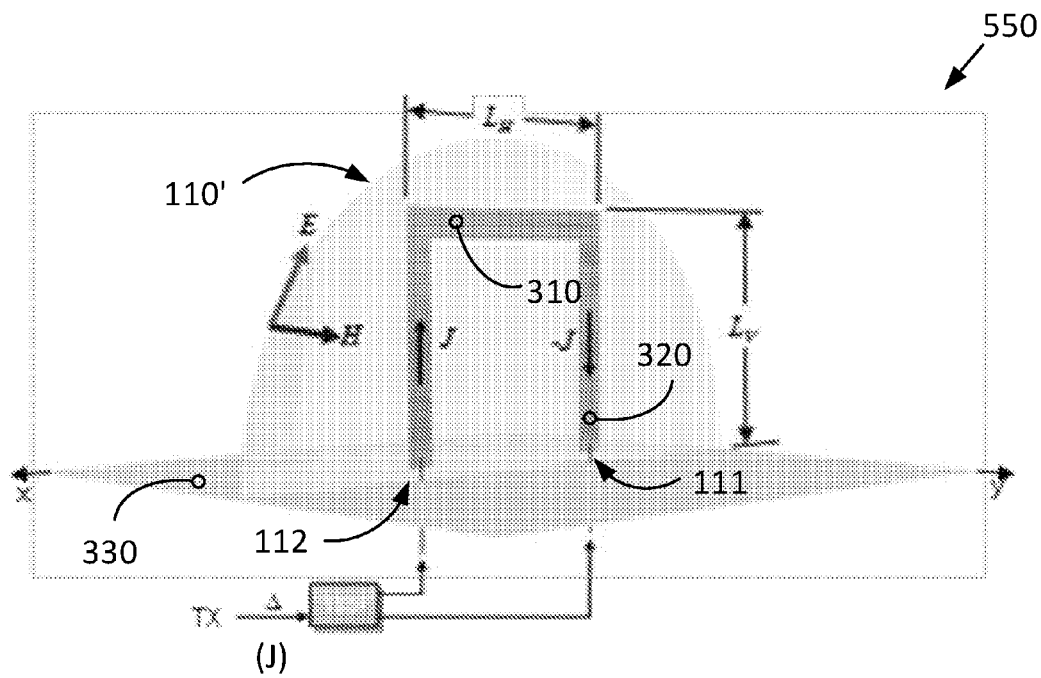

FIG. 5b shows a "U-shape" antenna of the disclosure with magnetic excitation, i.e., where the first and second antenna signal are set to have opposite polarity on first 111 and second 112 antenna ports.

The antenna structures in FIGS. 5a/5b are arranged to be fed by a first common signal J connected to the summation port and the difference port of a hybrid coupler, respectively. The ground plane 330 of each antenna structure 110' is also shown in FIGS. 5a and 5b.

Figure 6A:
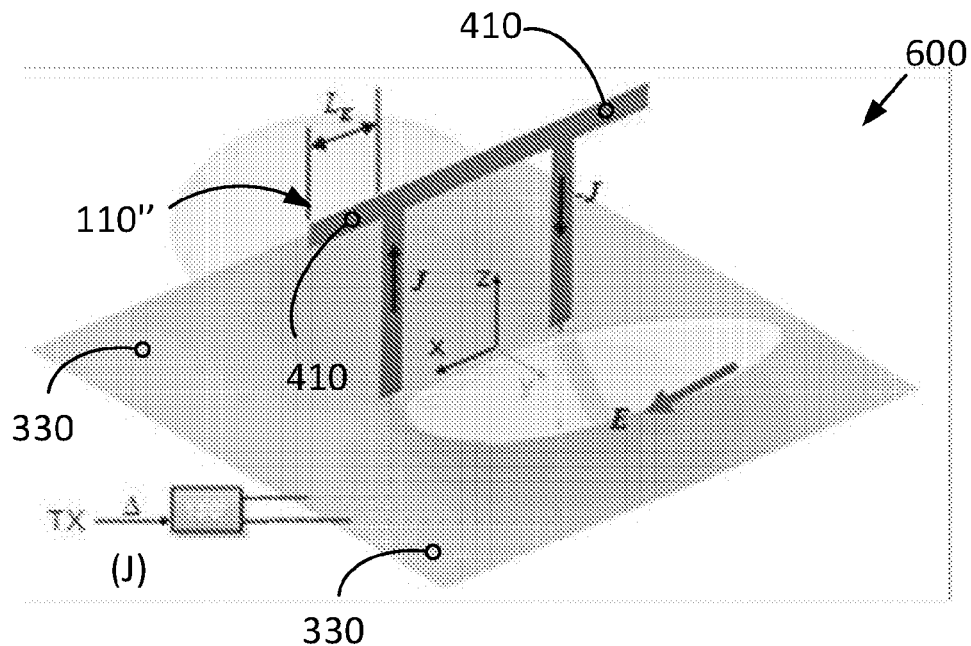

FIG. 6a shows a "Pi-shape" antenna with magnetic excitation, i.e., where the first and second antenna signal are set to have opposite polarity on first 111 and second 112 antenna ports. Note that it is only shown the contribution to the radiation pattern from the bide extension, which is added to the diagram of the original U-shape antenna of FIG. 5a/5b.

Figure 6B:
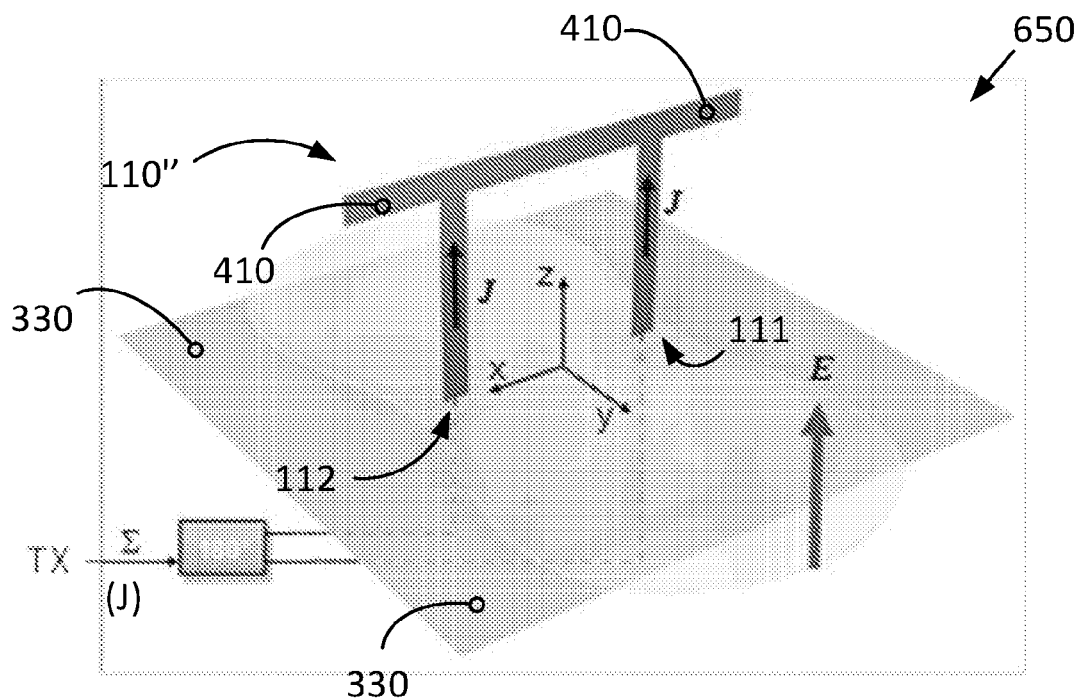

FIG. 6b shows a "Pi-shape" antenna with electric excitation, i.e., where the first and second antenna signal are set to have the same polarity on first 111 and second 112 antenna ports.

The antenna structures in FIGS. 6a/6b are also arranged to be fed by a first common signal J connected to the summation port and to the difference port of a hybrid coupler. The ground plane 330 of each antenna structure 110' is also shown in FIGS. 6a and 6b.

Shown in FIGS. 5 and 6 are also electric and magnetic field vectors E and H, respectively, of the antenna systems indicating field directions.

The present antenna system design comprises two modes of vehicle integration, one that exploits the U antenna as is, and the other a modification of the U antenna. Before discussing actual aircraft integration, this modification will be described, with reference to FIG. 4. As seen in FIG. 4 the basic U shape has been altered to a Pi-shape by extending the bridge of the U to a given distance outside either leg. In this case, when the total length of the bridge including extension units is half a wavelength and when feeding the legs with opposite polarity, the current running through the bridge between the legs will excite a resonance in the extended bridge by which it will start radiating as a horizontal half wavelength dipole. Doing so it will interact with its mirror image in the ground plane which (because the net electric field in the ground plane must be zero) will create an electric field of opposite polarity. As a result the radiation created in the broadside direction will again be zero. If the distance $L_V$ is half a wavelength, then maximum radiation will be in the vertical direction. Gain will be increased in directions between the vertical and broadside directions (though going eventually to zero as the broadside direction is approached), in which both electric dipole radiation of the extended bridge and the magnetic dipole radiation combines. In these directions, it is understood that the electric field is parallel to the direction of the bridge.

When the legs of the Pi antenna are fed in phase, only the legs—behaving as monopoles—should be excited. No excitation of the bridge occurs. For this reason the extension units must not extend beyond a quarter of a wavelength. Applying the discussion above regarding acceptable bandwidth one finds that $L_V$, $L_H$ and extension units should all be smaller than half of the smallest wavelength of the common antenna signal. Thus the total length of the bridge shall be less than the smallest wavelength. In the example above a total bridge length (including extension units) of 3 m for the low band and 0.75 m for the high band is conceivable.

By exciting the horizontal bridge at two separated points the full wavelength excitations of the resulting dipole are pushed to higher frequencies compared to a centrally fed dipole. Thus the separated feeds enable the antenna to be longer and thus more efficient without compromising the radiation pattern, which is an advantage of the present technique.

We finally mention certain preferred modes of aircraft integration of the Pi-shape and U-shape antenna types described above.

The ideal antenna illumination pattern for low frequency radar mapping should provide maximum radiation at approximately 30° depressed direction (with respect to the horizon) at right angles to the flight axis and either to the left or right. The direction should preferably be selectable. For the essentially dipole type of antennas considered here the beams are very wide and diffuse meaning that even though the maximum direction may point in another direction it may well be sufficient also at this ideal direction.

Figure 7:
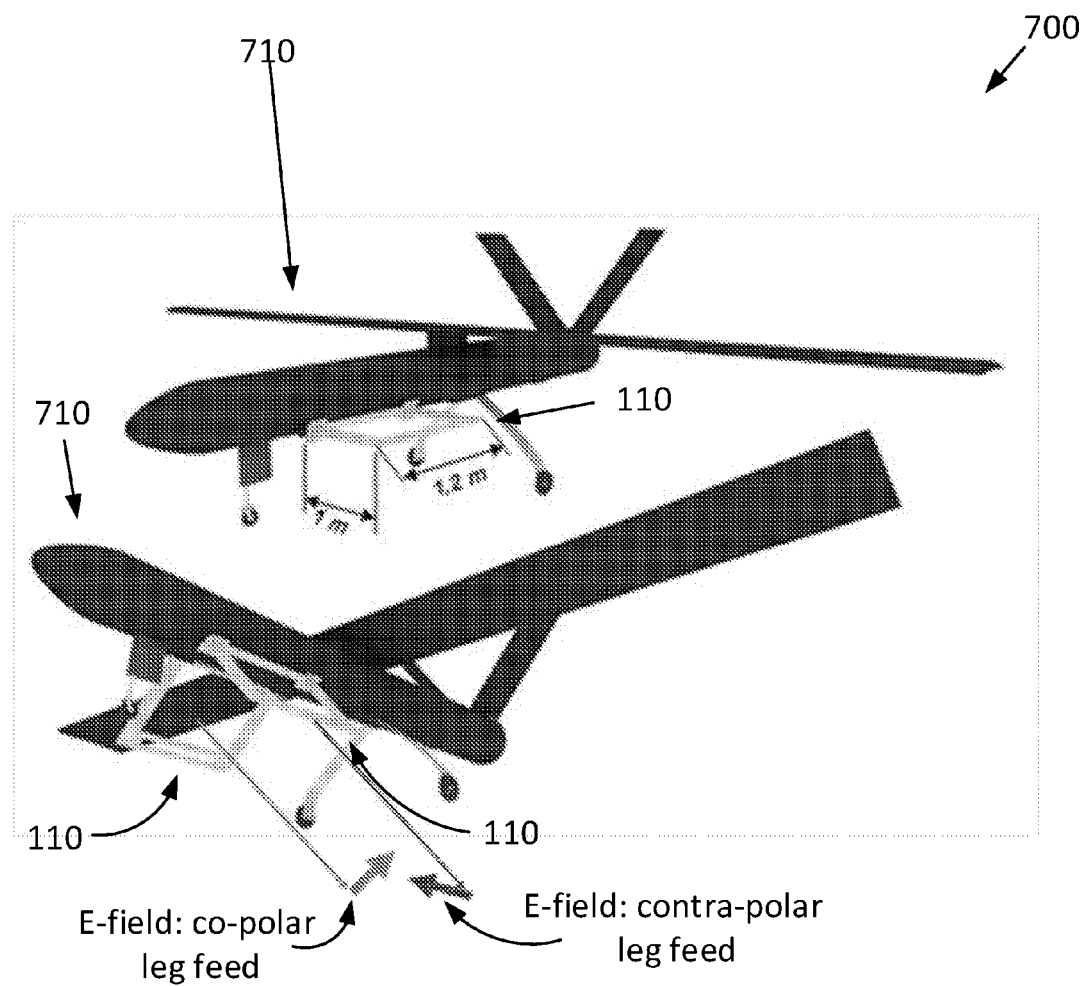
Figure 8:
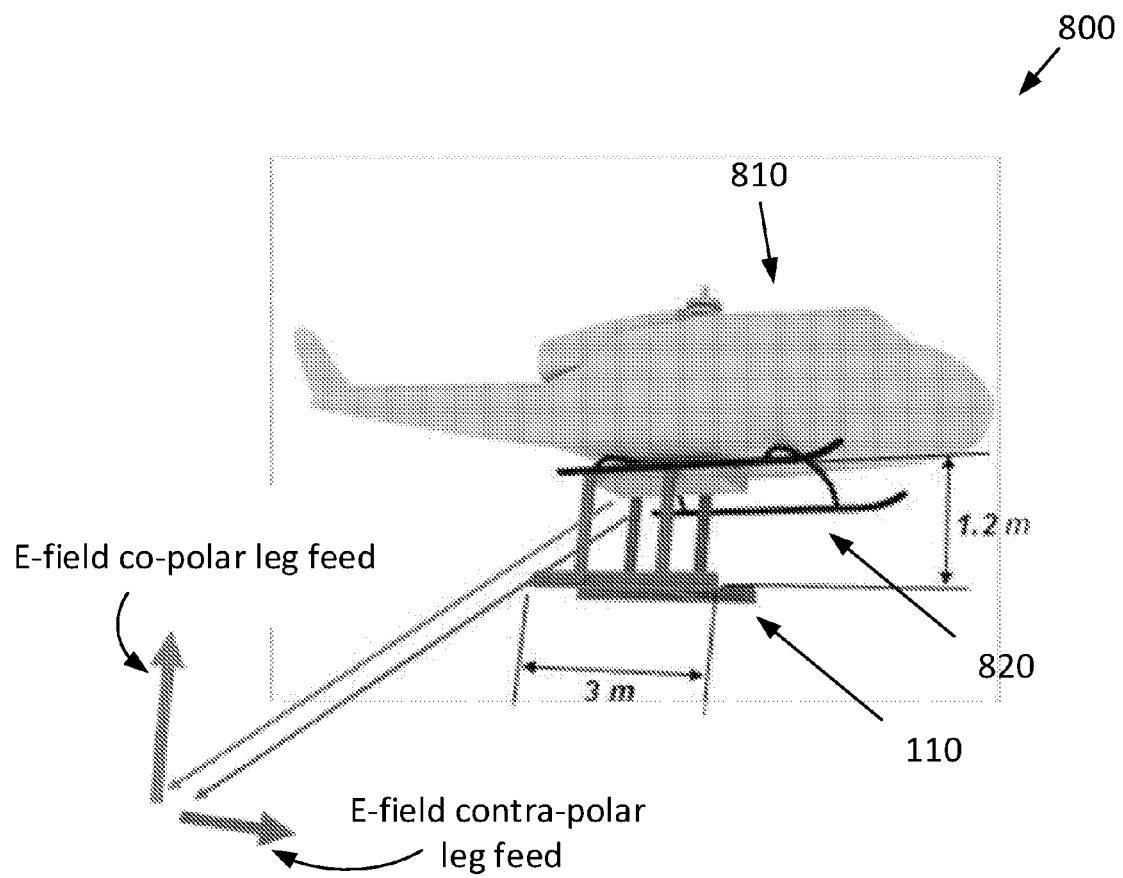

FIGS. 7 and 8 illustrate two examples of modes of integration for the U-shape and Pi-shape antennas of the present teaching.

When integrating the antennas described here on an aircraft, the aircraft body is considered the ground plane. The conditions for this assumption to be valid is that the aircraft has dimension of many wavelengths and has good conductivity (if this should turn out not to be the case it must be painted with conductive paint). However, it may not be required that the antennas are installed on a continuous or flat area of the aircraft—also very irregular structures may serve the purpose of a ground plane (a typical case is that the underside of the landing skids of a helicopter may behave as a ground plane).

FIGS. 7 and 8 each show an example of an airborne vehicle 710, 810 arranged to carry an antenna system 100, 200, 300, 400 according to the present disclosure.

The airborne vehicles 710, 810 can, as shown in FIG. 7 and FIG. 8, further be arranged to carry a first and a second antenna system 100, 200, 300, 400, i.e., double antenna structures.

FIG. 7 shows a "U-shape" antenna installation on a Hermes 450 un-manned aerial vehicle, UAV. In flight right and left U-shape antennas swing down to a 45° depression with respect to the horizontal plane. With electric excitation of right hand antenna and magnetic of left hand antenna, the right antenna provides vertical polarization to the left while the left antenna provides horizontal polarization to the left. With these excitations both antennas have radiation nodes to the right, so the requited one-sidedness of the radiation pattern is achieved.

Thus, according to an aspect, the length of the elongated bridge is approximately 1.2 meters, and the length of both legs is approximately 1 meter.

According to another aspect, the length of one of the legs is approximately 0 meters, thus substantially forming a single leg antenna system (not shown in FIG. 7).

As seen in FIGS. 5a/5b discussed above, then radiation patter of the U-shape antenna can be chosen to obtain horizontal polarization to one side by magnetic excitation of the U-shape antenna at the same side. For vertical polarization the opposite side antenna is used with electric excitation.

FIG. 8 shows a "Pi" antenna installation on a Bell 212 Huey helicopter. The landing skids prevent use of the antenna concept shown in FIG. 7. Instead, an arrangement is used where the antenna unit unfolds in air from a collapsed position between the landing skids when the helicopter is on ground. The right and left antenna are fed with a 90° phase shift and are separated by a quarter of the center frequency wavelength to obtain a one-sided radiation diagram. The radiation intensity maximum is directed downwards from the helicopter, i.e., directed towards ground, but since the radiation pattern is very diffuse a significant amount of radiation hits the ground also at relatively shallow depression angles of approximately 30°.

As is exemplified in FIG. 8, certain platform designs, in particular helicopters equipped with landing skids, preclude the preferred 45° depressed position of the U-shape antenna arrangement. Use of the Pi antenna arrangement can then be suitable. Note however that the U-shape antenna arrangement can be allowed to swing clear of the ground thus increasing the field of application for the arrangement. FIG. 7 is an example of where such a mechanical movement is allowed (this case is actually concept where the downward movement of the antennas is actuate by wind forces when the UAV is settling to its normal cruise attitude-these forces works against a spring load keeping the antennas horizontal when on ground).

Also, note that the Pi-shape antenna like the U-shape antenna with contra-polar feed has maximum radiation normal to the ground plane, i.e. in the downward direction in FIG. 8. However, the U antenna radiates equally strong to the front and to the rear of the platform resulting in low gain outside the plane of the antenna. The Pi antenna radiates less strongly to the front and rear resulting in stronger radiation outside the plane of the antenna and in particular in the required radiation directions between down and broadside.

Some radar applications derive resolution from the aircraft motion (so called synthetic aperture). Thus in contrast to radar in its simplest form the antenna directivity is not required for getting the angular resolution of the radar. However, a prerequisite for synthetic aperture principle to be applicable is that the radar responses only stem from one side of the aircraft. Thus, the antenna arrangement must allow any responses coming from the other side of the aircraft to be effectively suppressed.

Further, when the antenna is non-directive, the radar signal transmitted though the antenna will strongly couple to the metallic structure of the aircraft itself. This interaction cannot be efficiently handled unless antennas are allowed to geometrically extend from the aircraft by a distance of at least quarter of a wavelength order (herein meter order).

Thus, according to an aspect, the length of the elongated conductive bridge 310 with extension units 410, 420 is approximately 3 meters, and the length of each leg is approximately 1.2 meters.

According to one aspect, the antenna system of the present disclosure is adapted to be mounted on an airborne vehicle 710, 810.

According to another aspect, the antenna system 100, 200, 300, 400 is adapted to be mounted on a surface based vehicle.

According to an aspect, the airborne vehicle 710, 810 is arranged as a ground plane of the antenna system 100, 200, 300, 400.

According to an aspect, the antenna system 100, 200, 300, 400 is adapted to be mounted on an airborne vehicle 810 comprising first and second landing skids 820, the antenna system being arranged between the first and second landing skids 820.

Figure 9:
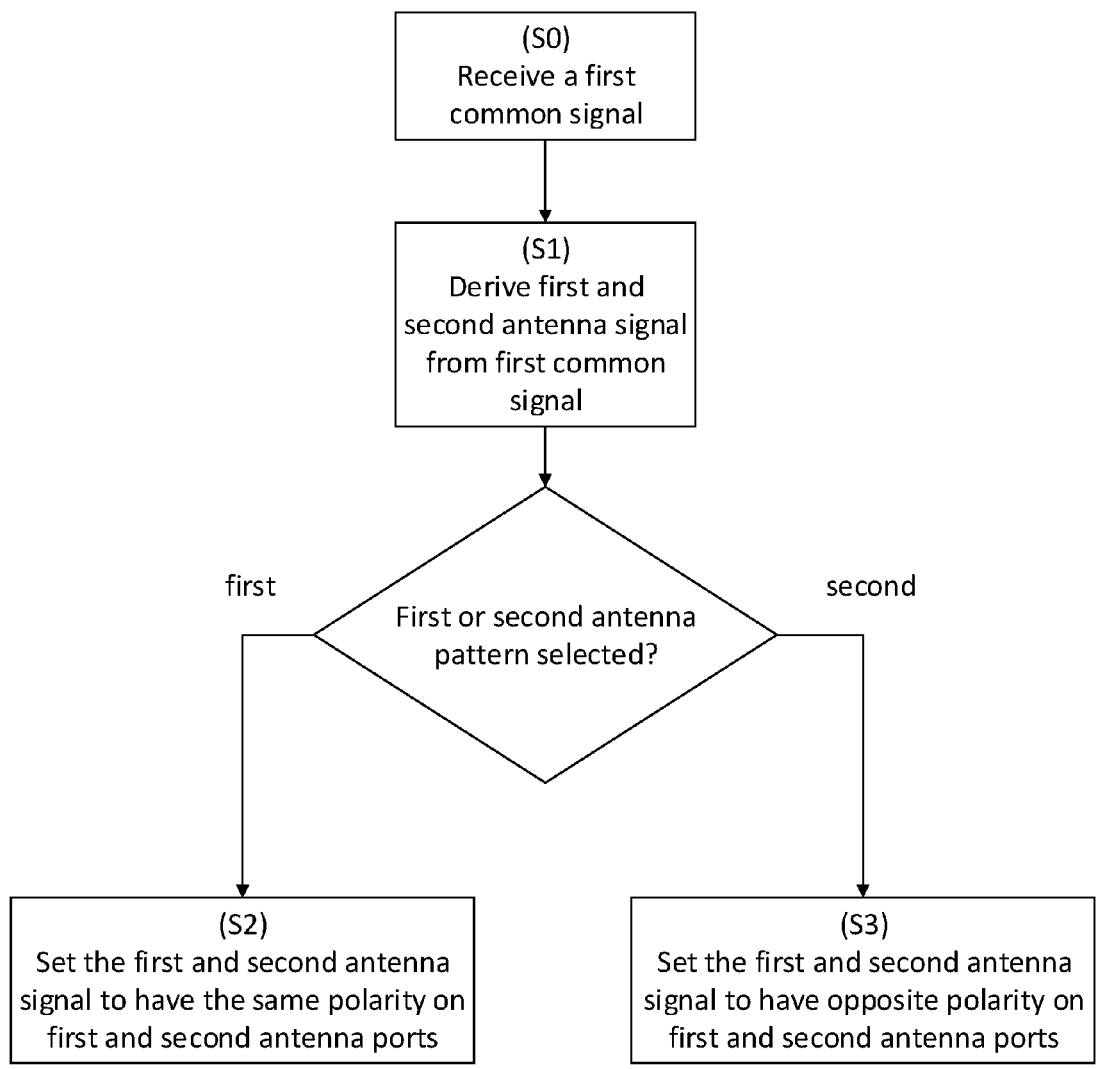
FIG. 9 shows a flowchart illustrating methods of the disclosure.

FIG. 9 shows a flowchart illustrating a method for selecting an antenna pattern of an antenna system 100. The antenna system 100 comprises an antenna structure 110 consisting of a single antenna element having first 111 and second 112 antenna ports arranged to pass a respective first and second antenna signal, the antenna pattern of the antenna structure 110 is arranged to be selectable between a first antenna pattern having a first polarization and a second antenna pattern having a second polarization substantially orthogonal to the first polarization, the method comprising the steps of receiving S0 a first common signal, and deriving S1 the first and second antenna signals from the first common signal, as well as setting S2 the first and second antenna signal to have the same polarity on first 111 and second 112 antenna ports in case the first antenna pattern is selected, and setting S3 the first and second antenna signal to have substantially opposite polarities on first 111 and second 112 antenna ports in case the second antenna pattern is selected.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. An antenna system (100) comprising an antenna structure (110) consisting of a single antenna element having first (111) and second (112) antenna ports arranged to pass a respective first and second antenna signal, the first and second antenna signals arranged to be derived from a first common antenna signal ($J_1$) and arranged to be essentially equal in envelope, the antenna structure (110) being arranged to have an antenna pattern which is selectable between a first antenna pattern having a first polarization and a second antenna pattern having a second polarization substantially orthogonal to the first polarization, the first antenna pattern being selected by setting the first and second antenna signal to have the same polarity on first (111) and second (112) antenna ports, the second antenna pattern being selected by setting the first and second antenna signal to have substantially opposite polarities on first (111) and second (112) antenna ports.

2. The antenna system (100) according to claim 1 arranged in either of a receiver mode, a transmitter mode, or a transceiver mode, the antenna structure (110) when in receiver mode being arranged to output antenna signals on first (111) and second (112) antenna ports received via the antenna structure (110), the antenna structure (110) when in transmitter mode being arranged to receive antenna signals on first (111) and second (112) antenna ports to be emitted via the antenna structure (120), the antenna structure (110) when in transceiver mode being arranged to simultaneously output and receive antenna signals on first (111) and second (112) antenna ports.

3. The antenna system (200) according to claim 1, further comprising a first antenna interface unit (210) comprising a 180 degree hybrid coupler (220), a switching unit (230), and a first common port (213) for passing the first common antenna signal ($J_1$), the 180 degree hybrid coupler (220) having first (211) and second (212) coupler ports connected to the first (111) and to the second (112) antenna port, respectively, as well as a summation (221) and a difference (222) port connected to the switching unit (230), the switching unit (230) being arranged to connect the first common port (213) of the antenna interface unit (210) to either of the summation port (221) or the difference port (222) of the 180 degree hybrid coupler (220), thus selecting between the first and the second antenna pattern of the antenna system (200).

4. The antenna system (250) according to claim 1, the first (111) and second (112) antenna ports further being arranged to pass a third and a fourth antenna signal, respectively, the third and fourth antenna signals having substantially identical envelopes and are derived from a second common antenna signal ($J_2$) substantially orthogonal to the first common antenna signal ($J_1$), the antenna system (250) further comprising a second antenna interface unit (260), the second antenna interface unit (260) comprising second (261) and third (262) common ports for passing the first ($J_1$) and the second ($J_2$) common antenna signal, respectively, as well as a 180 degree hybrid coupler (220), the 180 degree hybrid coupler (220) having first (211) and second (212) coupler ports connected to the first (111) and to the second (112) antenna port, respectively, as well as a summation (221) and a difference (222) port connected to the second (261) and third (262) common ports, respectively, thus selecting the first polarization for one of the first ($J_1$) and the second ($J_2$) common signal, and selecting the second polarization for the other of the first ($J_1$) and second ($J_2$) common signal.

5. The antenna system (250) according to claim 4, wherein the first ($J_1$) and the second ($J_2$) common signal are orthogonal by separation in frequency.

6. The antenna system (250) according to claim 4, wherein the first ($J_1$) and the second ($J_2$) common signal are orthogonal by separation in time.

7. The antenna system (250) according to claim 4, wherein the first ($J_1$) and the second ($J_2$) common signal are orthogonal by separation in code.

8. The antenna system (300) according to claim 1, the antenna structure (110') comprising an elongated conductive bridge (310) having a length ($L_H$) between first and second ends smaller than half of the wavelength corresponding to the highest frequency of the first common antenna signal ($J_1$), the antenna structure (110') further comprising two elongated conductive legs arranged in parallel and having respective lengths ($L_{V1}$, $L_{V2}$) between first and second ends smaller than half of the wavelength corresponding to the highest frequency of the first common antenna signal ($J_1$), said legs (320) being attached at first leg ends to either end of the elongated conductive bridge (310) in right angles with respect to the conductive bridge (310), thus substantially forming a U-shape, the sum of lengths of the elongated conductive bridge (310) and the two elongated conductive legs (320) being substantially equal to half of the wavelength corresponding to the center frequency of the first common antenna signal ($J_1$), the first (111) antenna port being connected to the second end of one leg, the second (112) antenna port being connected to the second end of the other leg, the antenna structure (110') being arranged to have a ground plane (330) orthogonal to both legs and located approximately at the second ends of the legs, the antenna structure (110') having a total length ($L_{TOT}$), including elongated conductive bridge (310) and both legs (320), less than the wavelength corresponding to the highest frequency of the first common antenna signal (J1).

9. The antenna system (400) according to claim 8, wherein the elongated conductive bridge (310) is extended by first (410) and second (420) conductive extension units connected at either end of the elongated conductive bridge (310), thus substantially forming a H-shape, the total length of the elongated conductive bridge with extension units (410, 420) being smaller than the wavelength corresponding to the highest frequency of the common antenna signal (J).

10. The antenna system (100, 200, 300) according to claim 1, wherein the length of the elongated bridge is approximately 1.2 meters, and the length of both legs is approximately 1 meter.

11. The antenna system (100, 200, 300) according to claim 1, wherein the length of one of the legs is approximately 0 meters, thus substantially forming a single leg antenna system.

12. The antenna system (100, 200, 400) according to claim 9, wherein the length of the elongated conductive bridge (310) with extension units (410, 420) is approximately 3 meters, and the length of each leg is approximately 1.2 meters.

13. The antenna system (100, 200, 300, 400) according to claim 1, wherein the antenna system is configured to be mounted on an airborne vehicle (710, 810).

14. The antenna system according to claim 13, wherein the airborne vehicle (710, 810) is a ground plane of the antenna system (100, 200, 300, 400).

15. The antenna system (100, 200, 300, 400) according to claim 13, wherein the antenna system is configured to be mounted on an airborne vehicle (810) comprising first and second landing skids (820), and wherein the antenna system is positioned between the first and second landing skids (820).

16. The antenna system (100, 200, 300, 400) according to claim 1, wherein the antenna system is configured to be mounted on a surface based vehicle.

17. An airborne vehicle (710, 810) configured to carry the antenna system (100, 200, 300, 400) according to claim 1.

18. An airborne vehicle (710, 810) configured to carry a first and a second antenna system (100, 200, 300, 400) according to claim 1.

19. A method for selecting an antenna pattern of an antenna system (100), the antenna system (100) comprising an antenna structure (110) consisting of a single antenna element having first (111) and second (112) antenna ports arranged to pass a respective first and second antenna signal, the antenna pattern of the antenna structure (110) arranged to be selectable between a first antenna pattern having a first polarization and a second antenna pattern having a second polarization substantially orthogonal to the first polarization, the method comprising the steps of:
- receiving (S0) a first common signal,
- deriving (S1) the first and second antenna signals from the first common signal,
- setting (S2) the first and second antenna signal to have the same polarity on first (111) and second (112) antenna ports in case the first antenna pattern is selected, and
- setting (S3) the first and second antenna signal to have substantially opposite polarities on first (111) and second (112) antenna ports in case the second antenna pattern is selected.

* * * * *

UNITED STATES PATENT AND TRADEMARK OFFICE
CERTIFICATE OF CORRECTION

PATENT NO. : 9,618,606 B2
APPLICATION NO. : 15/124885
DATED : April 11, 2017
INVENTOR(S) : Hellsten Page 1 of 1

It is certified that error appears in the above-identified patent and that said Letters Patent is hereby corrected as shown below:

In the Specification

Column 13
Line 24, "H-shape" should read --Π-shape--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*